(12) United States Patent
Lang

(10) Patent No.: US 8,628,131 B2
(45) Date of Patent: Jan. 14, 2014

(54) PRODUCT GRIPPER SYSTEM

(75) Inventor: Michael Lang, Buching (DE)

(73) Assignee: Multivac Sepp Haggenmueller GmbH & Co. KG, Wolfertschwenden (DE)

(*) Notice: Subject to any disclaimer, the term of this patent is extended or adjusted under 35 U.S.C. 154(b) by 0 days.

(21) Appl. No.: 13/564,452

(22) Filed: Aug. 1, 2012

(65) Prior Publication Data
US 2013/0033049 A1    Feb. 7, 2013

(30) Foreign Application Priority Data

Aug. 2, 2011    (DE) .................. 10 2011 109 967

(51) Int. Cl.
*B25J 15/00*    (2006.01)
*B66C 1/42*    (2006.01)

(52) U.S. Cl.
USPC ............................... 294/197; 294/2; 294/67.2

(58) Field of Classification Search
USPC ............... 294/86.4, 106, 2, 67.2, 67.22, 67.3, 294/67.33, 197, 103.1, 119.1; 414/620, 414/626, 796, 789.8, 790.3
See application file for complete search history.

(56) References Cited

U.S. PATENT DOCUMENTS

| | | | |
|---|---|---|---|
| 4,746,255 A | 5/1988 | Roccabianca et al. | |
| 5,088,783 A * | 2/1992 | Squires | 294/81.54 |
| 5,282,659 A * | 2/1994 | Yasuraoka et al. | 294/2 |
| 5,628,539 A * | 5/1997 | Muchalov et al. | 294/103.1 |
| 8,210,586 B2 * | 7/2012 | Hawes | 294/86.4 |
| 8,267,452 B2 * | 9/2012 | Weber | 294/207 |
| 2009/0317221 A1 * | 12/2009 | Hawes | 294/103.1 |
| 2010/0225131 A1 * | 9/2010 | Weber | 294/67.33 |
| 2012/0086226 A1 * | 4/2012 | Weber | 294/81.54 |

FOREIGN PATENT DOCUMENTS

| | | | |
|---|---|---|---|
| DE | 102008023762 A1 | 3/2009 | |
| EP | 0063400 B1 | 10/1982 | |
| EP | 1986941 A1 | 11/2008 | |

* cited by examiner

*Primary Examiner* — Paul T Chin
(74) *Attorney, Agent, or Firm* — Husch Blackwell LLP

(57) ABSTRACT

A gripper system for improving the picking up of a product, in particular of an elastic article. The gripper system having a gripper, wherein the gripper comprises an endless transport belt and a lever system. The lever system includes a rotatably supported lever, a support and an entrainer configured to entrain the transport belt, wherein the lever is connected to the support such that, in response to a linear movement of the support, the lever will be rotated about a center of rotation. The lever is additionally connected to the entrainer such that the transport belt moves in response to the rotational movement of the lever.

18 Claims, 4 Drawing Sheets

PRODUCT GRIPPER SYSTEM

CROSS-REFERENCE TO RELATED APPLICATION

This Application claims priority to German Application Number 102011109967.4 filed Aug. 2, 2011 to Michael Lang entitled "Gripper System," currently pending, the entire disclosure of which is incorporated herein by reference.

FIELD OF THE INVENTION

The invention relates to a gripper system that can be used e.g. for picking up, conveying and putting down products in automatic packaging or production plants.

BACKGROUND

A gripper system with a transport belt for picking up products is described in EP 1 986 941 A1. The gripper system includes a transport belt which is tensioned around a plate. For picking up a product to be conveyed, the plate is pushed below the product; whereby the transport belt moves relative to the plate. This arrangement largely avoids a relative movement between the transport belt and the product. It is, however, disadvantageous in so far as picking up of a product that is not additionally supported. A similar gripper system is disclosed by EP 0 063 400 B1.

There is therefore a need in the art for a gripper system that is configured to pick up products that are not additionally supported.

SUMMARY OF THE INVENTION

It is the object of the present invention to provide a gripper system which improves the picking up of a product, in particular of an elastic article.

The gripper system according to the present invention comprises a gripper including an endless transport belt and a lever system. The lever system may comprise a rotatably supported lever, a support and an entrainer entraining the transport belt, the lever may be connected to the support such that, in response to the linear movement of the support, the lever may be rotated about a center of rotation. In addition, the lever may be connected to the entrainer such that the transport belt will move in response to the rotational movement of the lever. This system may be advantageous insofar as the lever system, which acts as a transmission mechanism, allows a movement of the support that causes in a movement of the transport belt. This can advantageously be used when a product is picked up, since the product is pulled onto the gripper in response to the movement of the transport belt. In view of the fact that an oppositely directed movement of the transport belt is caused when the product is put down, a product that has been extended during picking up would be compressed to the same extent during putting down.

For moving the support rapidly and efficiently, a pneumatic cylinder connected to the support may be provided.

In order to accomplish a robust transmission of force from the support to the lever, it may be expedient to provide a first contour on the lever, a first pin, which is connected to the support, moving along the first contour.

According to a preferred embodiment, the first contour is curved in shape so as to accomplish by means of the curved shape of the contour an adequate transmission function for the lever system, similar to a slotted link control.

Alternatively, a second contour may be provided on the lever, a second pin, which may be connected to the transport belt, moving along this second contour. Due to the fact that the second contour can be designed freely, this arrangement leads to a flexible control of the transport belt. Furthermore, weight is saved through the additional opening provided on or in the lever, and, consequently, lighter masses are accelerated which may increase efficiency.

The first and/or the second contour may be configured as a groove or slot on or in the lever. This promotes a reliable engagement between the pin and the contour. Due to the higher weight reduction and the resultant reduction of the accelerated masses, a slot may also have a positive effect on the movement characteristics of the gripper system.

In order to realize the lever system in a space-saving manner on or in the gripper, the lever may be angular in shape.

The lever may comprise a first and a second arm, said first and second arms being arranged in an L-shaped configuration and a center of rotation being provided between said first and said second arm.

For picking up elastic objects it may be expedient for the transport belt to have movement of a certain range in a direction opposite to the direction of the linear movement of the support. One embodiment includes a range of around fifteen millimeters (15 mm); however, any length of movement is within the scope of the present invention. One benefit of this range is that the height of the plate, which is enclosed by the endless transport belt of the gripper, can be overcome and the lifting of the object to be picked up is improved through additional pulling by means of the transport belt.

Since the objects to be picked up differ from one another in their elasticity and their physical consistency, it may make sense that the length of the movement of the support is adjustable so as to provide a desired distance of movement of the transport belt. By means of this adjustment, the resulting compression and extension of the object to be picked up can be controlled in each individual case.

For a uniform, non-tilting movement of the transport belt an additional lever system may be arranged on the gripper, wherein the additional lever system may be arranged as a mirror image of the first lever system relative to the transport belt.

For protecting the movable parts of the lever system, a housing may be provided for the gripper system.

For improved picking up of the product, a second gripper may additionally be provided, said second gripper being arranged as a mirror image of the first gripper. The object or product to be picked up is located between the first and the second gripper just before it is picked up by one of the grippers or both.

Other and further objects of the invention, together with the features of novelty appurtenant thereto, will appear in the course of the following description.

DESCRIPTION OF THE SEVERAL VIEWS OF THE DRAWINGS

In the accompanying drawings, which form a part of the specification and are to be read in conjunction therewith in which like reference numerals are used to indicate like or similar parts in the various views.

Identical components at designated by identical reference numerals throughout the figures.

DETAILED DESCRIPTION OF THE INVENTION

Figure 1:
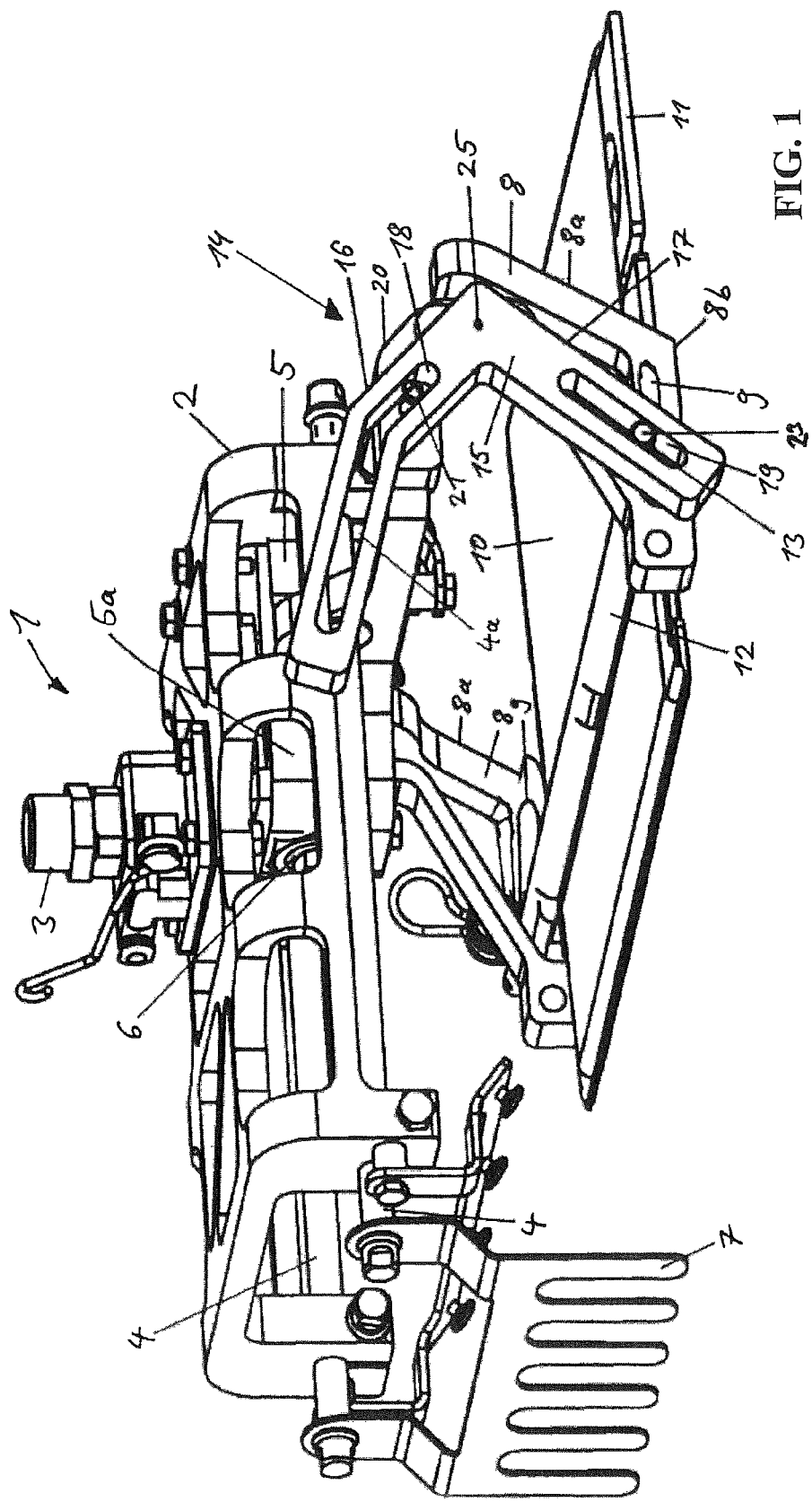
FIG. 1 is a perspective view of one embodiment of a gripper system in accordance with one embodiment of the present invention.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

FIG. 1 shows a perspective view of a gripper system 1 according to the present invention. The gripper system 1 can be used for picking up, conveying and putting down articles or products, which may e.g. be foodstuffs. The gripper system 1 is especially intended to be used for conveying elastically yielding foodstuffs, such as pieces of meat.

The gripper system 1 comprises a central body 2 having on the upper side thereof a connection 3 for supplying power or pressurized air to the gripper system 1. The central body 2 is additionally provided with two parallel guide rods 4, which are partially enclosed by the central body 2 and which extend along the lower longitudinal side of the central body 2. The guide rods 4 project beyond the central body 2 on at least one end thereof.

Figure 4:
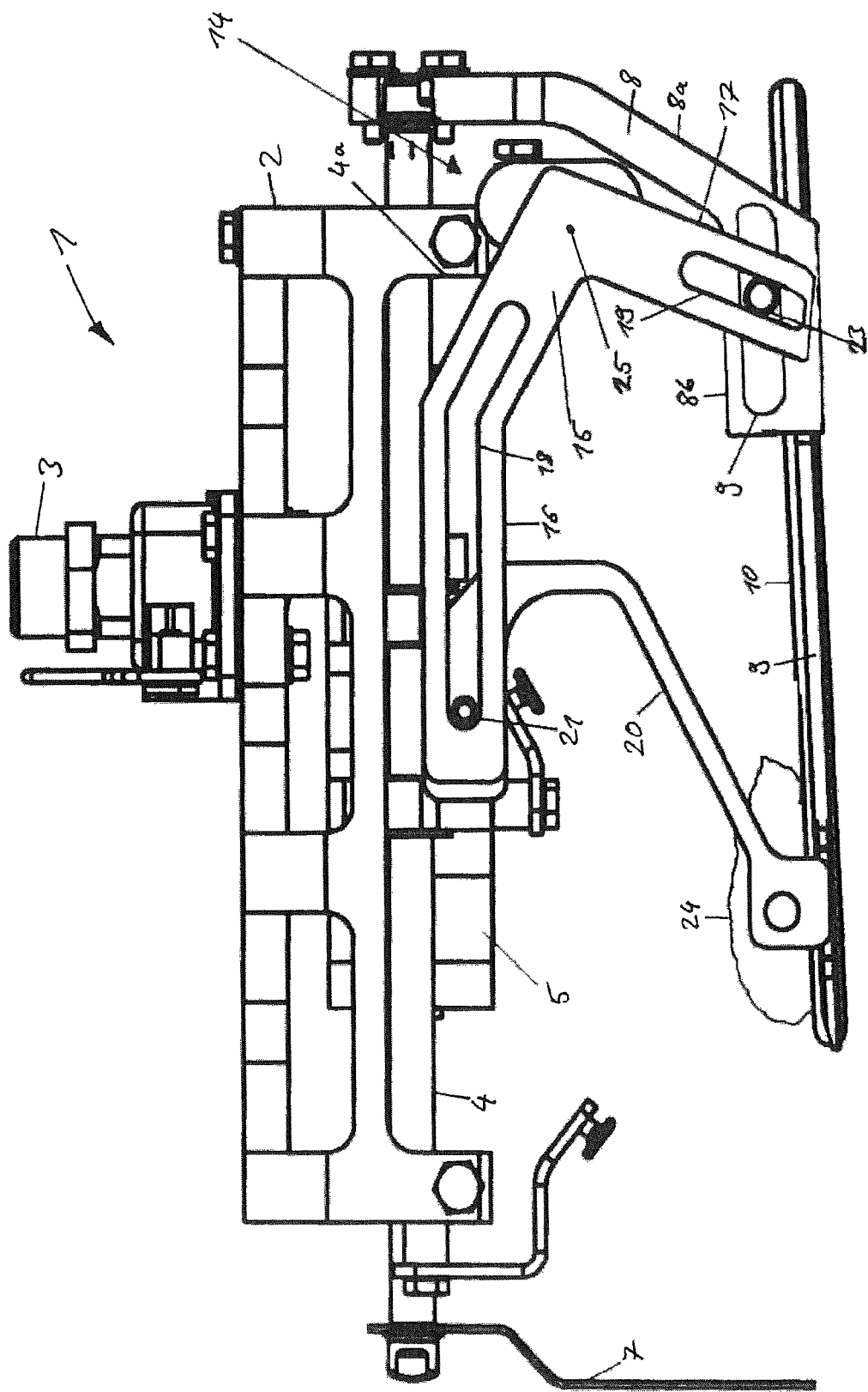
FIG. 4 is a side view of the gripper system of FIG. 1 showing the lever system at an end position.

On the lower side of the central body 2, a gripper 5 is linearly movable along the guide rods 4. For moving the gripper 5, e.g. a pneumatic cylinder 5a or an electric motor, which is not shown, may be provided. The guide rods 4 extend through openings 6 of the gripper 5. On an end of the guide rods 4 projecting beyond the central body 2, the guide rods 4 have secured thereto a stop plate 7 on the outer side of the central body 2. On the end of the guide rods 4 located opposite the stop plate 7, a stop device 4a is provided as a limit point for the gripper 5. The gripper 5 thus moves between an open position at the end of the central body 2 located opposite the stop plate 7 (shown in FIG. 2) and an end position at the stop plate 7 (as shown in FIG. 4).

The gripper 5 has, on either of its two lateral ends, a respective arm 20 used for securing a plate 11 thereto. The belt fastening units 8 extend downwards from the side of the central body 2 and are angular in shape. A first portion 8a of the belt fastening unit 8 extends downwards, a second portion 8b follows the first one at an angle thereto and extends substantially horizontally and parallel to the guide rods 4. The second portion 8b of the belt fastening unit 8 is provided with a guide 9 in the form of an elongated hole whose function will be described hereinbelow.

The gripper 5 comprises an endless transport belt 10 made from a material which is suitable for use with foodstuffs and which is in conformity with applicable U.S. regulations, such as those of the Food and Drug Administration. The transport belt 10 is tensioned around the plate 11 without being firmly connected to said plate 11. The plate 11 extends between the two belt fastening units 8, so that the plate 11 including the transport belt 10 is arranged between the belt fastening units 8. Plate may be made from a plastic material, a metal or any other material suitable for the intended use.

The transport belt 10 has secured thereto a tunnel-shaped bag 12 which extends across the whole width of the transport belt 10 and of the plate 11. The tunnel-shaped bag 12 has a respective open end in the area of the belt fastening units 8. An entrainer 13 may extend through the bag 12 from one belt fastening unit 8 to the opposite belt fastening unit 8. At least one end of the entrainer 13 may be received in and guided by the elongated hole 9. The elongated hole 9 is arranged in the lower portion 8b of the belt fastening unit 8 and guides the entrainer 13. One embodiment of entrainer 13 is a metal rod.

The gripper 5 additionally comprises a lever system 14, which is arranged on one side of the gripper 5 in this embodiment. Alternatively, an additional lever system may also be arranged, as a mirror image of the first lever system 14, on the gripper side opposed to the first lever system 14. The lever system 14 arranged on the outer side of the belt fastening unit 8 includes an L-shaped lever 15. The lever 15 comprises two arms 16, 17, each provided with a contour 18, 19 having the shape of a slot. The contour 18 of the first arm 16 is curved within itself, whereas the contour 19 of the second arm 17 is substantially straight in shape relative to the arm 17.

In addition, the lever system 14 is provided with a support 20 on either side of the transport belt 10. The plate 11 extends between the two supports 20 and is secured to these two supports 20, e.g. by a clamp connection. The lever 15 is arranged outside the support 20. The support 20 arranged on the side of the lever 15 is connected to said lever 15 by means of a pin 21. To establish a form-fit connection, the pin 21 may engage the contour 18 of the first arm 16. Pin 21 can additionally be secured to the lever 15 by a force-fit connection, such as a pin retainer mechanism. The lever system 14 essentially functions similar to a slotted link control.

In the embodiment illustrated in FIG. 1, the support 20 is further connected to the pneumatic cylinder 5a. However, in an alternative embodiment when the gripper system 1 is electrically operated, the support 20 may be connected to an electric motor. The pneumatic cylinder 5a is secured to the gripper system 1.

Figure 2:
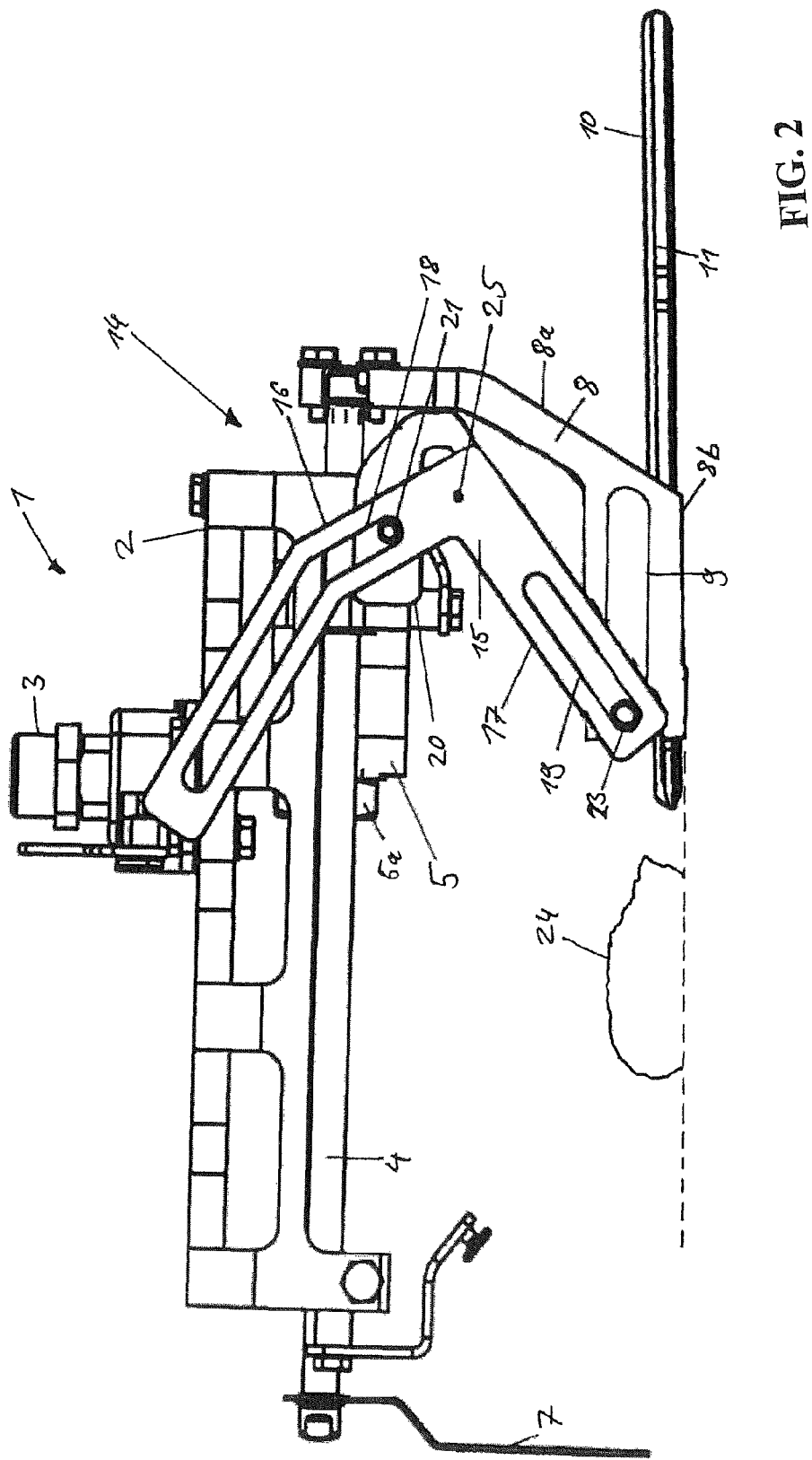
FIG. 2 is a side view of the gripper system of FIG. 1 showing the lever system at a starting position.

In use, the gripper system picks up a product 24. FIG. 2 shows the gripper system 1 in an open position wherein the gripper 5 is located at one end of the guide rods 4. At this position, the pneumatic cylinder 5a is at an extended position. In this position of the gripper system 1, the pin 21 is located at a first end of the first contour 18. Another pin 23, which is connected to the entrainer 13, brings the second contour 19 of the lever 15 into engagement with the elongated hole 9 of the belt fastening unit 8. Also, at the open position, the pin 23 is at a non-activated position at a first end of the elongated hole 9.

Starting from the open position shown in FIG. 2, the gripper system 1 is able to pick up a product 24. The gripper 5 and the support 20, respectively, move along the guide rods 4 towards the stop plate 7 in response to actuation of the pneumatic cylinder 5a. This movement of the gripper 5 moves the plate 11 towards the product 24 to be picked up and creates a relative speed between the plate 11 and the transport belt 10 as the transport belt 10 moves around the plate 11.

Figure 3:
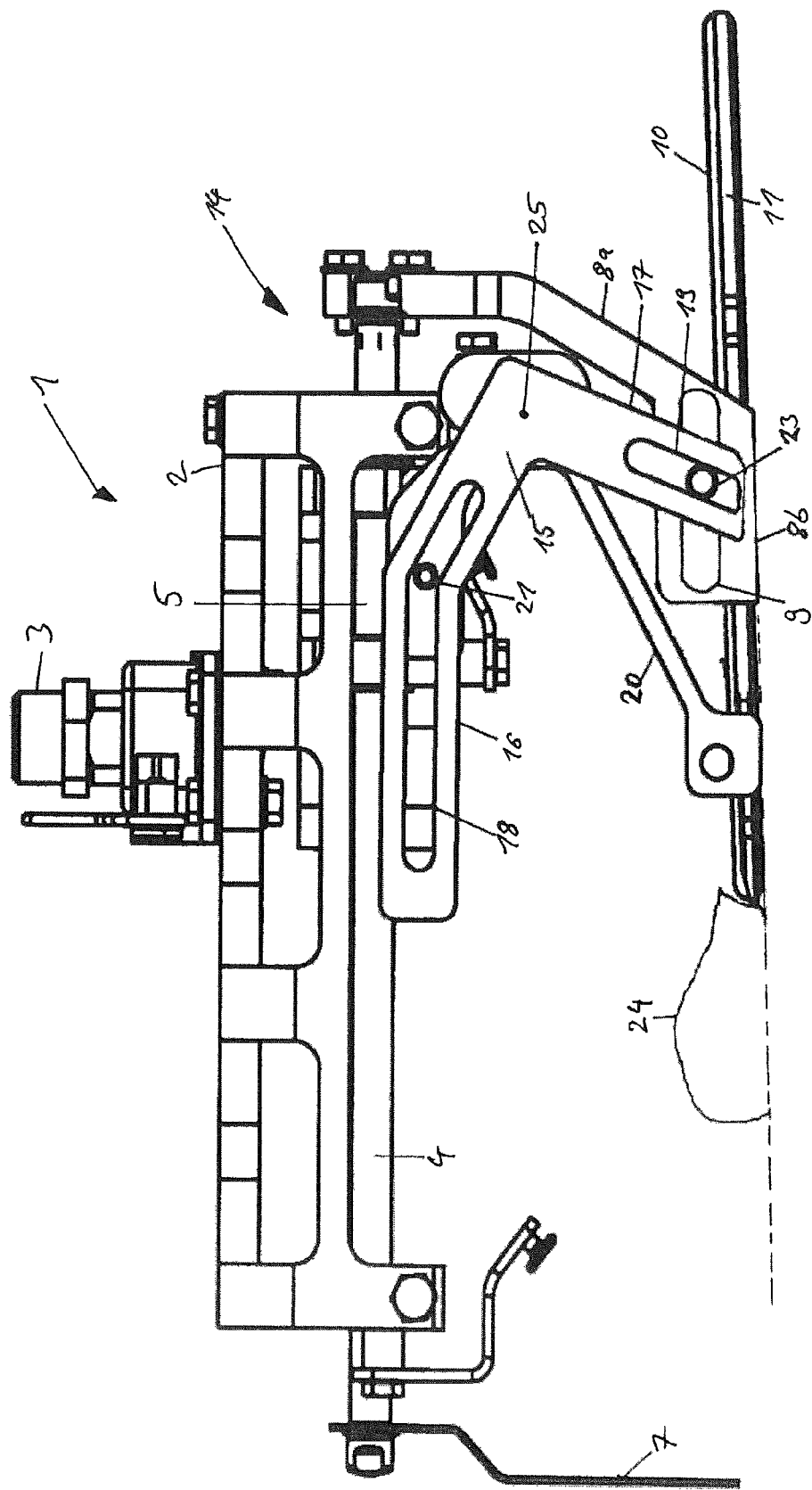
FIG. 3 is a side view of the gripper system of FIG. 1 showing the lever system at an intermediate position.

FIG. 3 shows a position of the gripper system 1 occupied by the latter while the product 24 is being picked up. To get from the open position to the pick-up position, the pneumatic cylinder 5a moves the support 20 together with the pin 21 towards the stop plate 7. The pin 21 thus moves along the contour 18 causing the lever 15 to be rotated counter-clockwise about a center of rotation 25. The center of rotation 25 is located between the two arms 16, 17. In response to this rotational movement, the pin 23 slides along the elongated hole 9 in a direction opposite to the direction of movement of the pneumatic cylinder 5a and of the support 20.

The pin 23 is connected to the entrainer 13, whereby the bag 12 and, consequently, the transport belt 10 move together with the pin 23 in the same direction, which is opposed to the direction of movement of the support 20. The curved shape of the first contour 18 of the lever 15 here has the effect that the lever 15 will first rotate at a higher speed around the center of rotation 25 and that, consequently, the transport belt 10 will move faster relative to the plate 11 and the product 24. If the contour 18 were not curved, no relative speed between the transport belt 10 and the product 24 would occur. The curved contour 18, however, results in a higher speed of the transport belt 10 relative to the product 24, whereby the thickness of the plate 11 can be overcome more easily by the product 24. The product 24 is thus partially pulled onto the plate 11 by the transport belt 10. The decisive factor for the height of the speed and the distance over which the transport belt 10 is accelerated is the curved contour 18 of the lever 15.

As soon as the pin 21 has passed the bend of the contour 18 and is located in an area of the contour 18 which is parallel to the lower portion 8b of the belt fastening unit 8, the transport belt 10 is no longer accelerated, whereby the relative speed between the transport belt 10 and the product 24 is eliminated. This means that, although the plate 11 still moves relative to the product 24, the transport belt 10 no longer moves relative to the product 24. The plate 11 is advanced to a position further below the product 24. This prevents further deformation of the product 24.

The picked-up product 24 can now be transported to its destination by the gripper system 1. At this destination, the pneumatic cylinder 5a is retracted, whereby the pin 21, which is connected to the support 20, follows the contour 18 in a direction opposite to the pick-up edge of the plate 11. As long as the pin 21 has not yet reached the bend of the contour 18, no relative speed will occur between the transport belt 10 and the product 24. When the pin 21 has overcome the bend of the contour 18, the transport belt is reaccelerated, whereby a relative speed occurs between the transport belt 10 and the product 24. If, due to the acceleration, the product 24 should have been deformed and/or extended during picking up, the product will now undergo an opposite deformation and/or compression due to the acceleration in the opposite direction. Since also the gripper 5 moves back to the starting position, the product 24 is put down at its destination due to the withdrawal of the plate 11.

Starting from the embodiment shown, the gripper system 1 according to the present invention can be modified in many ways. For example, the lever system 14 may be provided on either side of the transport belt 10. In addition, gripper 5 may be provided in duplicate on the central body 2 of the gripper system 1, wherein the second gripper replaces the stop plate 7 of the above embodiment. Further, entrainer 13 may be of another shape, including the shape of the plate.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions and methods described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A product gripper system comprising:
a gripper comprising an endless transport belt tensioned around a plate and a lever system, said lever system having a rotatably supported lever, a support and an entrainer entraining the transport belt, wherein the lever is connected to the support such that, in response to a linear movement of the support, the lever will be rotated about an axis of rotation that is parallel to a plane defined by the plate, and wherein the lever is additionally connected to the entrainer such that the transport belt will move in response to the rotational movement of the lever to facilitate the gripping of a product.

2. The product gripper system of claim 1, wherein a pneumatic cylinder connected to the support is provided.

3. The product gripper system of claim 1, wherein the lever includes a first contour, and a first pin connected to the support and moveable along the first contour.

4. The product gripper system of claim 3, wherein the first contour is curved in shape.

5. The product gripper system of claim 3, wherein the lever is provided with a second contour, and a second pin connected to the transport belt and moveable along the second contour and wherein the first contour and/or the second contour are configured as a groove or slot on or in the lever.

6. The product gripper system of claim 1, wherein the lever is provided with a second contour, and a second pin connected to the transport belt and moveable along the second contour.

7. The product gripper system of claim 1, wherein the lever is angular in shape.

8. The product gripper system of claim 1, wherein the lever comprises a first arm and a second arm, the first and second arms are arranged in substantially an L-shaped configuration and the lever rotates about the axis of rotation at a center of rotation of the lever being provided between the first and second arms.

9. The product gripper system of claim 1, wherein the transport belt moves in a direction opposite to the direction of the linear movement of the support.

10. The product gripper system of claim 9, wherein the transport belt moves in a certain range, preferably by at least 15 millimeters.

11. The product gripper system of claim 1, wherein a length of movement of the support is adjustable, said length of movement of the support defining a distance over which the transport belt can be moved.

12. The product gripper system of claim 1, wherein the gripper has further provided thereon an additional lever system, wherein the additional lever system is arranged as a mirror image of the first lever system relative to the transport belt.

13. The product gripper system of claim 1, further comprising a second gripper being arranged as a mirror image of the first gripper.

14. A product gripper system comprising:
   a central body and a first and second belt fastening unit, each belt fastening unit coupled to the central body, and at least the first belt fastening unit having an elongated hole;
   a moveable endless transport belt tensioned around a plate for gripping a product, the plate being positioned between the first and second belt fastening units wherein the transport belt includes a tunnel-shaped sleeve extending across a width of the transport belt and an entrainer extending through the tunnel-shaped sleeve, the entrainer having at least one end received in the elongated hole of the first belt fastening unit; and
   a lever system comprising a support operably connected to the plate, a lever including a first arm having a first contour and a second arm having a second contour, wherein the first aim of the lever is operably connected to the support by a first pin slideable within the first contour, and wherein the second arm of the lever is operably connected to the first belt fastening unit by a second pin slideable within the second contour and connected to the entrainer thereby bringing the second contour into engagement with the elongated hole of the first belt fastening unit; and
   an actuator operably connected to the support for effectuating a linear displacement of the support and the plate thereby causing rotation of the lever and translation of the transport belt relative to the plate to facilitate the gripping of a product.

15. The product gripper system of claim 14 further comprising:
   the second belt fastening unit having an elongated hole;
   a second lever system comprising a second support operably connected to the plate, a second lever including a first arm having a first contour and a second arm having a second contour, wherein the first arm of the second lever is operably connected to the second support by a third pin slideable within the first contour of the second lever, and wherein the second arm of the second lever is operably connected the second belt fastening unit by a fourth pin slideable within the second contour of the second lever and connected to the entrainer thereby bringing the second contour of the second lever into engagement with the elongated hole of the second belt fastening unit.

16. The product grippers system of claim 14 wherein the transport belt and the plate are orientated in a horizontal plane.

17. The product gripper system of claim 16 wherein the support and lever are orientated perpendicular to the transport belt and the plate.

18. The product gripper system of claim 14, wherein the actuator is a pneumatic cylinder.

* * * * *